United States Patent [19]

Rickwood

[11] Patent Number: 4,657,457
[45] Date of Patent: Apr. 14, 1987

[54] SCREW-ACTION CONNECTORS SECURITY MEANS

[76] Inventor: Gerald C. Rickwood, 20 Oakfield Drive, Formby, Merseyside, L37 1NR, England

[21] Appl. No.: 625,001

[22] Filed: Jun. 26, 1984

[51] Int. Cl.$^4$ .................. F16B 39/10; F16B 39/20
[52] U.S. Cl. ............................. 411/93; 411/96; 411/120; 411/121; 29/526 R
[58] Field of Search .................. 411/90, 91, 92, 93, 411/94, 95, 96, 97, 98, 99, 100, 116, 117, 118, 119, 120, 121, 122, 123, 124, 129, 130, 131; 29/526 R

[56] References Cited

U.S. PATENT DOCUMENTS

| | | | |
|---|---|---|---|
| D. 25,915 | 8/1896 | Bernard | 411/94 X |
| 482,907 | 9/1892 | Perry | 411/90 |
| 581,215 | 4/1897 | Lombas | 411/90 X |
| 597,293 | 1/1898 | Lombas | 411/98 X |
| 762,107 | 6/1904 | Wilson | 411/98 |
| 893,527 | 8/1907 | Fritz | 411/99 X |
| 1,008,084 | 11/1911 | Smith | 411/90 |
| 1,725,790 | 8/1929 | Halagarda | 411/96 X |
| 1,815,095 | 7/1931 | Brandt | 411/90 X |
| 4,385,454 | 5/1983 | Withers et al. | 411/95 X |

FOREIGN PATENT DOCUMENTS

| | | | |
|---|---|---|---|
| 56432 | 4/1891 | Fed. Rep. of Germany | 411/90 |
| 417294 | 8/1925 | Fed. Rep. of Germany | |
| 611578 | 7/1926 | France | 411/90 |
| 119538 | 4/1927 | France | |
| 225149 | 11/1924 | United Kingdom | 411/90 |
| 261328 | 11/1926 | United Kingdom | |
| 326721 | 3/1930 | United Kingdom | |
| 344695 | 3/1931 | United Kingdom | 411/98 |
| 538313 | 7/1941 | United Kingdom | |
| 942325 | 11/1963 | United Kingdom | |
| 2031546 | 4/1980 | United Kingdom | |

Primary Examiner—Thomas J. Holko
Attorney, Agent, or Firm—Robert H. Ware; Melvin I. Stoltz; Alfred A. Fressola

[57] ABSTRACT

A locking device for securing at least two screw-action connectors comprises a locking clip or element made from a good quality spring steel wire having a round or square section. The locking clip or element has a diagonal interconnecting part which extends tangentially between a pair of locking elements one at each end of the part. The locking elements (for example, coils) are wrapped round or placed over a portion of a wheel nut. The interference/friction fit between the wheel nut and the clip or element prevents axial movement of the clip relative to the nut. The part serves as restraining means positively linking tangentially adjacent wheel nuts and thereby prevents relative rotation thereof.

15 Claims, 18 Drawing Figures

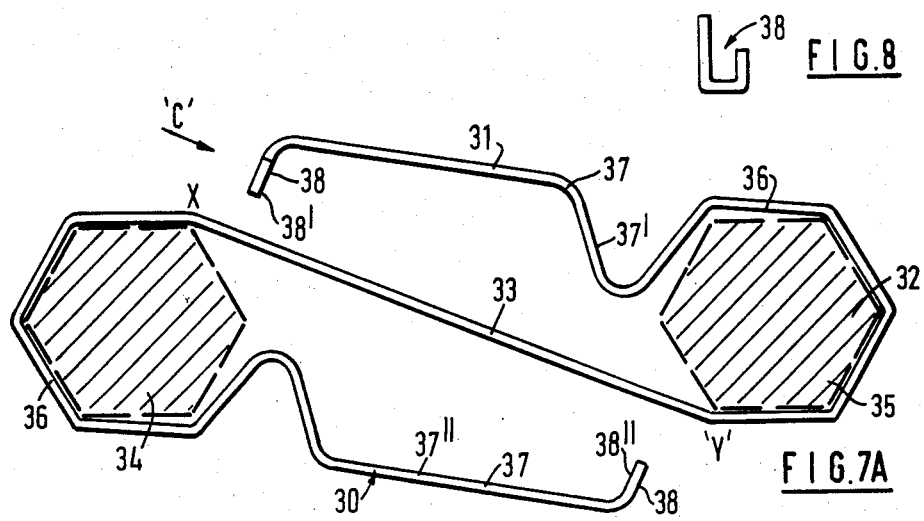
FIG. 7A
FIG. 8
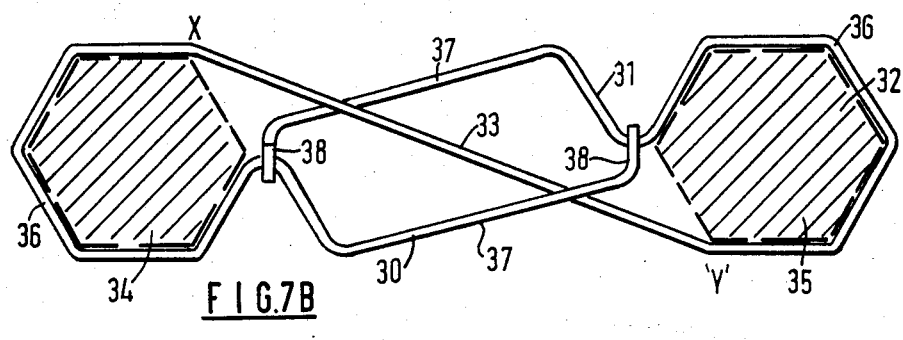
FIG. 7B
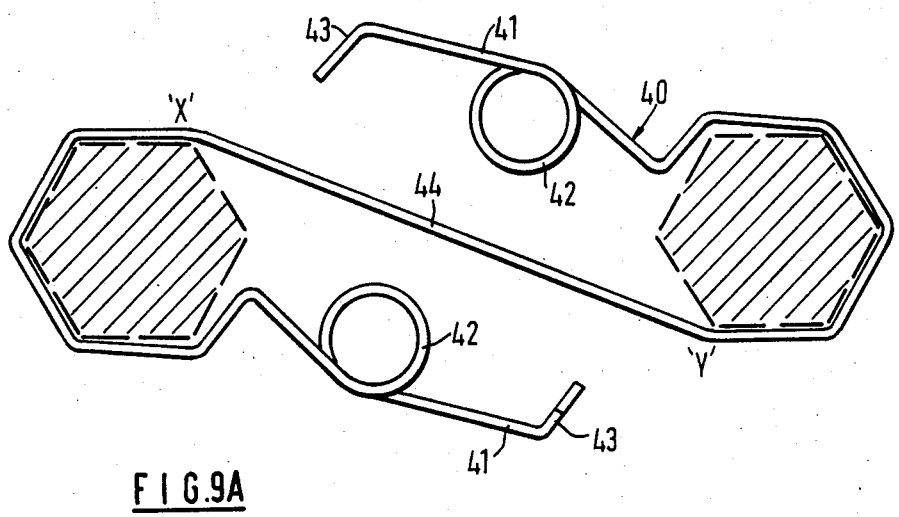
FIG. 9A

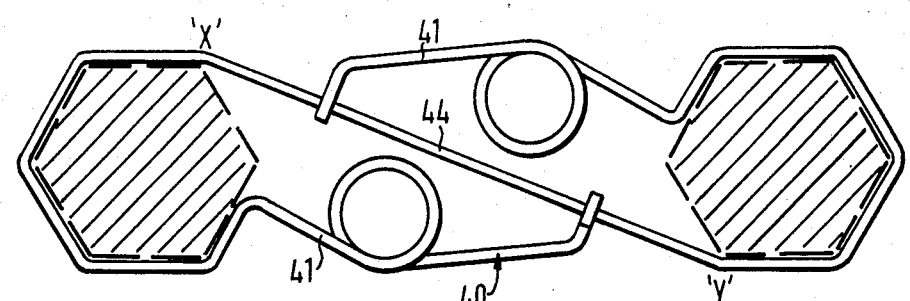
F I G.9B
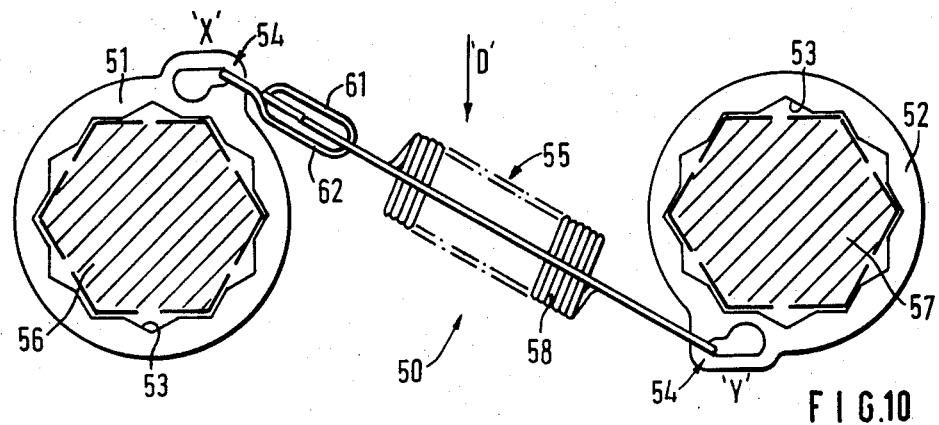
F I G.10
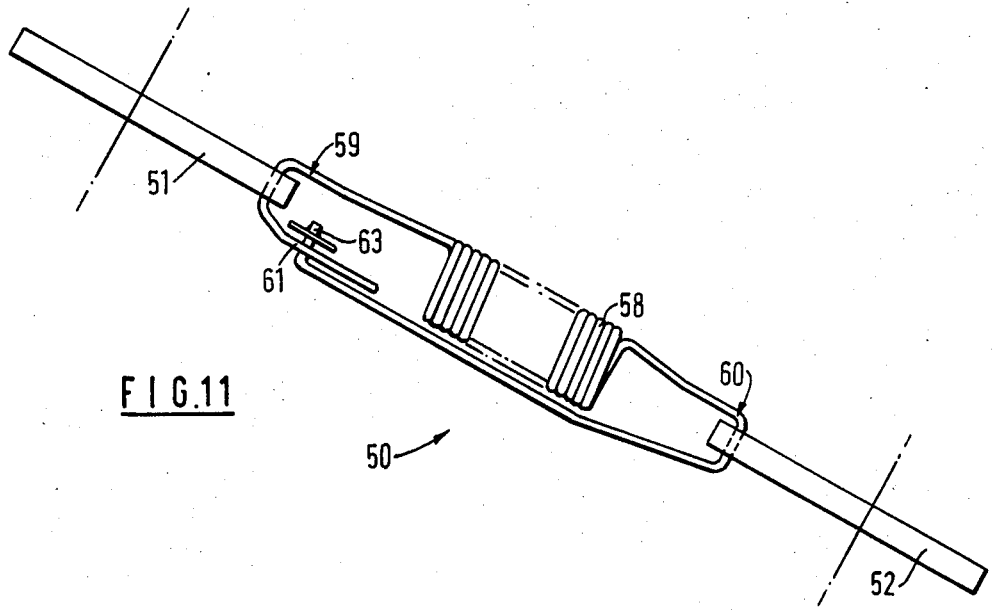
F I G.11

SCREW-ACTION CONNECTORS SECURITY MEANS

This patent relates to screw-action connectors security means and is particularly, but not exclusively concerned with the security of road wheels on vehicles.

There has been a problem over many years concerning the attachment and security of road wheels to vehicles, particularly commercial vehicles. The problem revolves around the security/efficiency of the wheel nut locking system. Disc wheels which are the norm are held onto the axle/hub by a number of wheel nuts usually six, eight or ten in number, which themselves are fitted to axle wheel studs or bolts.

Most common types of wheel mounting have a number of threaded studs equally spaced in a circle around the hub flange. These studs pass through holes in the wheel, which is secured by nuts screwed onto the studs.

Various wheel stud and nut systems exist. In one particular system, the area around each hole is pressed out to form a constant tapered seating which allows the hub to centre the wheel correctly. Each nut will then have a corresponding taper of, for example, 80°. It is possible for the nuts to have both ends tapered or tapered only at one end and flat-faced at the other.

Another wheel stud and nut system has each hole in the wheel formed with a varying taper, so as to present a spherical seating for a corresponding split locating cone or collar (or washer) arranged between the nut and the hole. In such a case, it is not necessary for the nut to have a tapered end adjacent the hole.

It can be seen that if all wheel nuts are removed the wheel may be detached from the wheel studs/bolts and subsequently from the axle. It then follows that if the wheel nuts become loose whilst the vehicle is in motion, i.e. with the wheel rotating, at the very least the radial load on the tyre and hence the wheel can cause severe damage to the wheel, the hub, the wheel studs/bolts and the wheel nuts. If unchecked the wheels can become detached from the axle/hub, either because the nuts have come off the wheel studs/bolts or because of complete failure of the studs/bolts owing to them being subjected to excessive bending loads. Obviously in this state the vehicle would be a danger to itself and other road users. The wheels nuts may become loose for one or more of the following reasons:

(1) One or more of the nuts has not been tightened to the correct torque;
(2) Excessive paint has been applied to the wheel which becomes pliable in service owing to heat being dissipated during braking aplications;
(3) Some form of debris has become trapped between the two wheels or between the inner wheel and the hub; and
(4) An incorrect nut has been fitted for any particular attachment arrangement.

In any particular circumstances other reasons may lead to wheel nuts becoming loose. It follows that if there was some way of preventing the nuts becoming loose a considerable amount of damage and danger would be eliminated.

Known means for maintaining wheel nuts in a tightened/locked mode, other than by the natural locking effect caused by tightness, has been by using a traditional self locking nut system. The self locking nut relies on an interference fit between the thread on the wheel studs/bolts and a portion of the thread in the nut either by deformation of a portion of the nut thread or by the insertion of a nylon insert in the nut in which the bolt/stud cuts the thread. The problem with the self locking nut is that it was intended to work at maximum locking efficiency for one locking or tightening cycle and, if used more than once, its locking capability is reduced dramatically. In addition whilst the locking mechanism is working, the nut cannot be tightened quickly by hand because the lock stiffens the rotation of the nut. This dictates that a spanner must be used at an earlier stage of the nut tightening. Use of the spanner at an earlier stage of the wheel nut tightening means that the final clamping of the wheel to the hub takes considerably longer than would be normal.

Thus, the two main disadvantages of the self-locking nut system are that an unacceptable amount of time is required to bolt the wheel to the hub and that the self locking nut fails to function after one or two locking or tightening cycles have taken place. This is unacceptable as a nut may have to be removed many times during the life of a vehicle. Replacement of worn-out or damaged nuts would become very expensive.

It is possible to make a special nut incorporating a separate locking mechanism but the cost is prohibitive, and any such locking or tightening operation is usually cumbersome. Damage can be done to other components and it is probable that the device can only be used with special wheel studs/bolts.

The present invention sets out to provide a locking device which substantially prevents the wheel nuts from turning or coming loose in a positive and economical manner. Furthermore, the present invention can be used on all existing wheel nut configurations, for example including castellated nuts used for securing disc wheels to any vehicle hub/axle. The present invention further sets out to provide a secure but easily removable locking device. The present invention further sets out to provide a locking device which provides a positive locking action and which is economic to produce.

According to a first aspect of the invention, there is provided a locking device for securing at least two screw-action connectors comprising means for anti-rotationally engaging both of said connectors, and means for interconnecting the engaging means to resist relative rotation of said connectors.

The engaging means may comprise two locking elements, each of which having an interference or frictional fit with said connectors, said locking elements gripping or engaging said connectors, thereby serving as anti-rotational means for said connectors.

The two locking elements may each be configured for cooperating engagement with a plurality of flat edges or the like, or alternatively with a plurality of apexes or the like, of said connectors.

The interconnecting means may be a substantially rectilinear member which extends between and is tangentially connected to diametrically opposed portions of each of the locking elements, the member being arranged to tighten one of said connectors in the event of the other of said connectors rotating or attempting to rotate.

The locking elements may each be configured as a regular hexagon, a twenty-four sided regular polygon, a circle or any suitable shape capable of gripping or engaging said connectors. Each of the locking elements may additionally comprise a limb for engagement with the interconnecting means, or for engagement with the limb of the other of the locking elements. Additional locking means may be provided to secure together each limb of the locking elements and the interconnecting means.

The locking elements and the interconnecting means may comprise a resilient or tensile member, preferably of clip form, and may be formed from, say spring steel. The locking elements and the interconnecting means may be treated to resist corrosion or the like, for example phosphated or zinc-coated.

The interconnecting means may comprise additional tensioning means to ensure a close interference or frictional fit between the locking elements and said connectors.

The locking device may be used to interconnect adjacent pairs of screw-action connectors.

Further tensioning means, such as a cam mechanism or a spring-assisted cam mechanism, may be additionally provided to cooperate with the interconnecting means.

The locking device is preferably used for securing a wheel to a vehicle hub or axle and is preferably suitable for securement to a wheel nut locking system.

According to a second aspect of the invention, there is provided a method of securing at least two screw-action connectors which comprises engaging both of said connectors by anti-rotational means and linking said anti-rotational means by interconnecting means adapted to resist relative rotation of said connectors.

The invention will now be described by way of example with reference to the accompanying drawings in which:

FIGS. 7A and 7B are enlarged schematic plan views of the second embodiment of FIG. 5 showing the embodiment in an open and closed position respectively;

FIG. 8 is a side view taken in the direction of arrow "C" in FIG. 7A;

FIGS. 9A and 9B are enlarged schematic plan views of a third embodiment of a locking device according to the invention, showing the embodiment in an open and closed position respectively;

FIG. 10 is an enlarged schematic plan view of a fourth embodiment of a locking device according to the invention;

FIG. 11 is a simplified side view taken in the direction of arrow "D" in FIG. 10;

Figure 1:
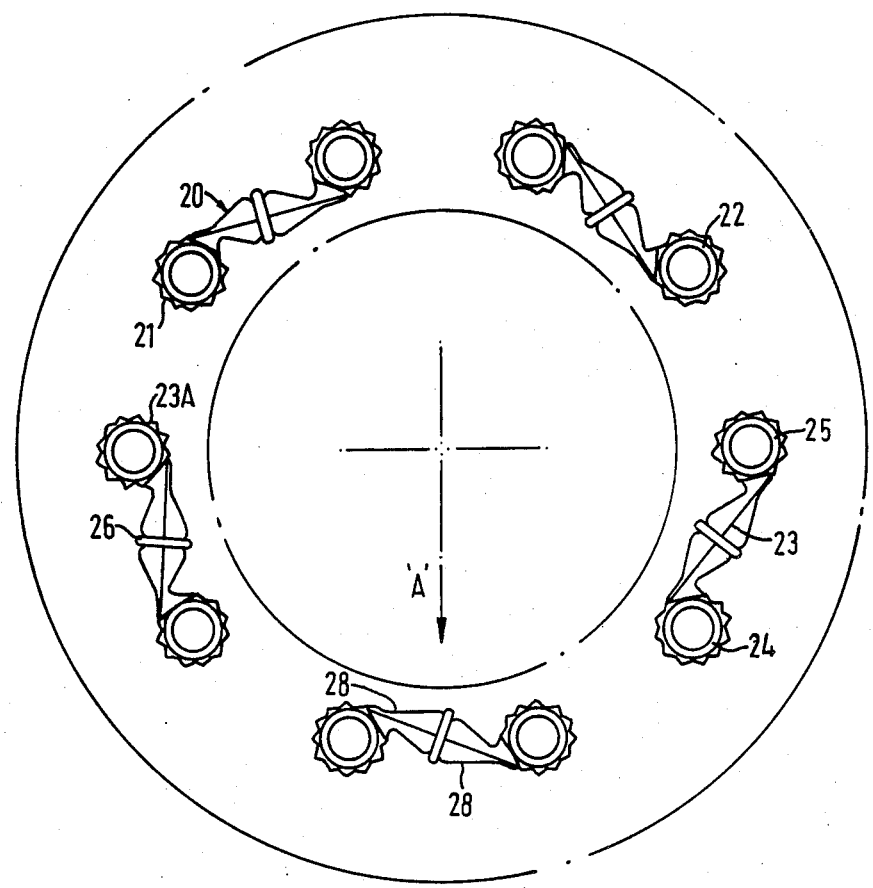
FIG. 1 is a schematic view of a vehicle wheel hub looking on the end of the axle, the wheel hub having a first embodiment of a locking device according to the invention.

FIGS. 1, 2, 3A, 3B and 4 show a locking device 20 comprising a locking element 21 shown as a clip. The clip or element 21 is wrapped round a portion of the wheel nut 22 and is clamped to the nut by virtue of the springiness/resilience of the material from which it is made. It would normally be made from a good quality spring steel having a width of approximately 16 mm and a thickness of approximately 1½ mm. The interference/friction fit between the wheel nut 22 and the spring clip or element 21 prevents axial movement of the clip relative to the nut i.e. the clip is prevented from coming off the nut. The clip or element 21 has a diagonal part 23 between points X and Y extending between two partial twenty-four sided polygons 23A. The diagonal part 23 serves as the actual restraining means, positively linking tangentially adjacent wheel nuts 24, 25 (shown shaded) and preventing rotation thereof.

Figure 3A:
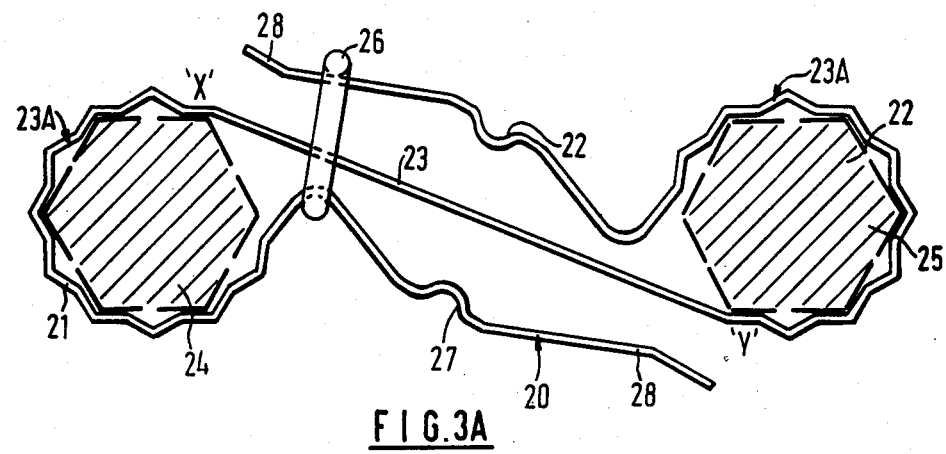
FIGS. 3A and 3B are enlarged schematic plan views of the first embodiment of FIG. 1 showing the embodiment in an open and closed position respectively.
Figure 3B:
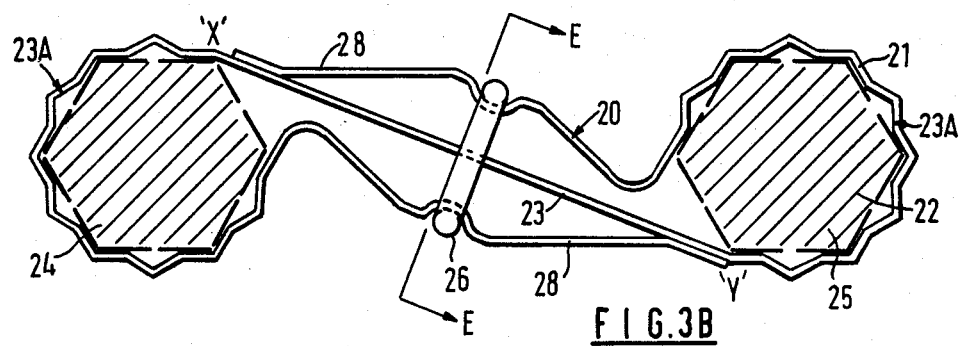
Figure 4:
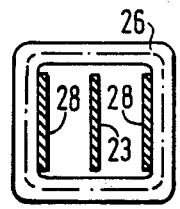
FIG. 4 is a section taken along the line 4—4 in FIG. 3B.
Figure 5:
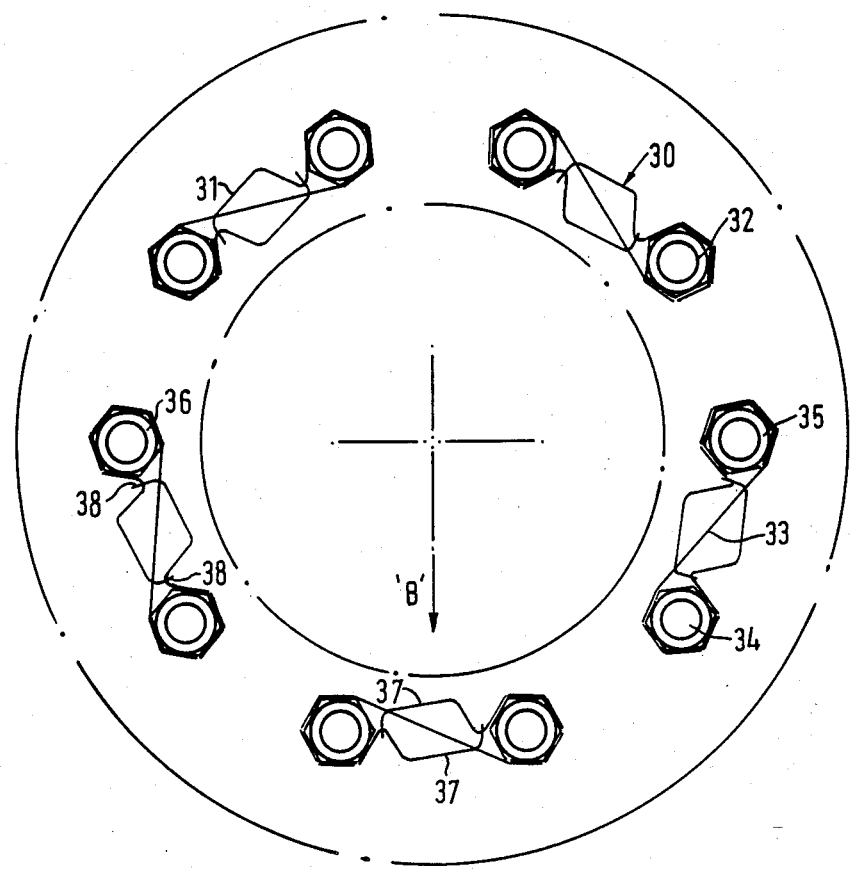
FIG. 5 is a schematic view of a vehicle wheel hub looking on the end of the axle, the wheel hub having a second embodiment of a locking device according to the invention.
Figure 6:
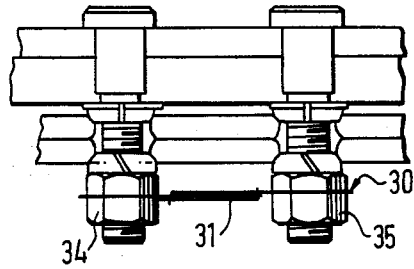
FIG. 6 is a side view taken in the direction of arrow "B" in FIG. 5.
Figure 12A:
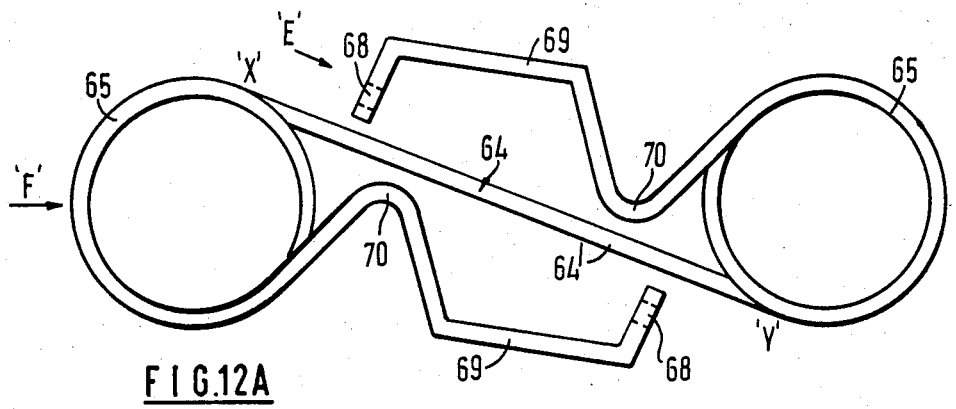
FIGS. 12A and 12B are enlarged schematic plan views of a fifth embodiment of a locking device according to the invention, showing the embodiment in an open and closed position respectively.
Figure 12B:
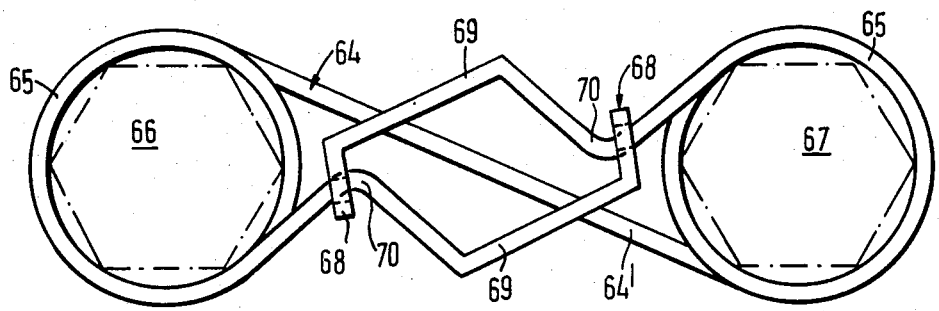
Figure 13:
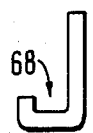
FIG. 13 is a side view taken in the direction of arrow "E" in FIG. 12A.
Figure 14:
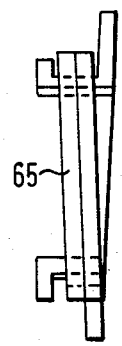
FIG. 14 is an end view taken in the direction of arrow "F" in FIG. 12A.

It will be seen from FIGS. 3A and 3B that if either of a pair of wheel nuts 24, 25 tries to loosen i.e. turn anticlockwise relative to the other, the diagonal part 23 between points X and Y will be in tension. This means that the nut, say 24, attempting to rotate in an anticlockwise direction, thus becoming loose, tends in fact to rotate the other nut, say 25, of the pair in a clockwise direction, thus tighten the other nut. In addition the nut i.e. 24 attempting to turn anticlockwise must also deform the assembled locking device which is not possible. Thus, if one wheel nut is loosened i.e. turned anticlockwise, the clip or element 21 tends to tighten around the wheel nut. If, however, the wheel nut is tightened i.e. turned clockwise, the clip or element 21 tends to "open up", which permits the hexagonal-shaped head of the wheel nut to index or click within the part 23A of the clip or element 21. This is an advantage in that it permits the wheel nut to be tightened even with a locking device in place on the wheel nut.

Figure 2:
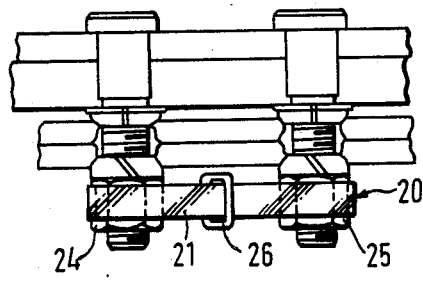
FIG. 2 is a side view taken in the direction of arrow "A" in FIG. 1.

With reference to FIG. 3A, the locking device 20 is shown in an open position. In this position the partial twenty-four sided polygon 23A is larger than the wheel nut and the clearance between the device and the nut allows it to be pushed axially onto the nuts. Once in position (location of typical device is shown in FIG. 2), a locking link 26 is pushed towards the centre of the clip or element where it locates in an arcuate detent portion 27 in each of a pair of locking limbs 28. By pushing the locking link 26 towards the detent portions 27 (against spring resilience in each limb) the locking limbs are moved towards the centre restraining diagonal part 23 (shown as X-Y). In doing so, the partial twenty-four sided polygon 23A is tightly wrapped around each wheel nut (as shown in FIG. 3B). By this action the locking device is secured to the nuts and at the same time prevents nut rotation.

It is possible during manufacture of this locking device 20 that one or more sides of the regular polygon 23A can be deformed to provide extra resistance to axial movement of the device relative to the wheel nut.

The locking device hereinabove described would normally be fitted to each pin stub hub after the wheel nuts have been tightened in the normal manner.

The fitment and installation of a second embodiment will now be described with reference to FIGS. 5, 6, 7A, 7B and 8, which show a locking device 30 comprising a locking clip 31 shown as a clip. The clip or element 31 is made from a good quality spring steel wire having a round or square section. The clip or element 31 is wrapped round a portion of wheel nut 32 and is clamped to the nut by virtue of the springiness/resilience of the material from which it is made. The interference/friction fit between the wheel nut 32 and the spring clip or element 31 prevents the axial movement of the clip relative to the nut i.e. the clip is prevented from coming off the wheel nut. The clip or element 31 has a diagonal part 33 between X and Y which serves as the actual restraining means positively linking tangentially adjacent wheel nuts 34, 35 shown shaded and preventing rotation thereof.

The locking clip or element of the device 30 may be shaped as a partial regular hexagon 36 (as shown in FIGS. 7A and 7B) or as a regular twenty-four sided polygon (not shown). The hexagonal-shaped locking portion 36 extends into a locking limb 37 which itself terminates in a hook portion 38 situated at the end portion of the limb. FIG. 8 is an end view of the hook taken in the direction of arrow C in FIG. 7A.

The locking device 30 is used in the following way. The wheel nuts are tightened in the normal manner and the device in the position shown in FIG. 7A is pushed over an adjacent pair of wheel nuts, say 34, 35. The locking limbs 37 are in a free position (as shown in FIG. 7A) and in this position the hexagonal-shaped locking portion 36 is actually larger than the wheel nut 34 or 35 that it is to be pushed over. Once in position the hook on the left hand side, i.e. the top locking limb hook 38', is pushed downwards and hooked under a part of the bottom locking limb 37''. In turn the bottom locking limb 37'' is pushed upwards so that the hook 38'' in the end portion of it i.e. the right hand hook 38' hooks over a portion of the top locking limb 37'. The locked position described is shown in FIG. 7B. It can be seen that the locking limb for the right hand locking clip or element has been hooked to the locking limb for the left hand locking clip or element and the locking limb of the left hand clip element has been hooked to the right hand limb for the right hand locking clip element. This ensures that both locking elements are pulled tightly round the hexagonal heads of the wheel nut 34, 35. In this position it can be seen that diagonal part 33 (shown as X-Y) plus the locking clip element round each wheel nut prevents any wheel nut movement. This arrangement also permits adjustment i.e. tightening of the wheel nuts to be carried out even when the locking device is in place on the wheel nut.

FIGS. 9A and 9B show a third embodiment 40 which is similar to the one described above and shown in FIGS. 7A and 7B. It is in fact a small variation on that design. The main difference lies in that each locking limb 41 has an extra coil 42 which helps to facilitate extra resilience or springiness in the locking limb. The locking hook 43, also shown in the locked position in FIG. 9B is attached to a diagonal part 44 serving as a restraining element (shown as X-Y), instead of the opposite locking limb as previously shown in FIGS. 7A and 7B. However by extending the locking hook 43 or by reshaping the locking limb, it would be quite possible for the two locking limbs to be hooked together in the locked position. This device 40 should be installed as described with reference to the device 30 shown in FIGS. 7A and 7B.

FIGS. 10 and 11 show a fourth embodiment of a locking device 50 which consists of two locking collars 51, 52, each of which having an internal shape of a regular hexagon or a twenty-four sided regular polygon 53 (as shown in FIGS. 10 and 11). The outer circumference of each locking collar 51, 52 has an anchorage point 54 for a tension spring 55 which is used as a connecting element between the two locking collars 51, 52.

The shape of the tension spring which can be easily seen in FIG. 10 is important for this application. The spring 55 is so shaped that in tension it is capable of restricting the amount of extension it will provide. This is particularly useful for this application as it is important to prevent the wheel nuts, say 56, 57 from turning in an anticlockwise direction. If standard tension springs are to be used in place of the particular tension spring 55, there would be a danger that the loosening or anticlockwise forces in each of the wheel nuts would extend the spring to such an extent that the wheel nuts would still rotate despite the tension in the coil of the spring. However, the tension spring 55 exerts enough pressure on the two locking collars 51, 52 to prevent them from moving axially relative to the nuts 56, 57 respectively i.e. from coming off the wheel nuts. Also the spring 55 should prevent the wheel nuts becoming loose i.e. turning anticlockwise. However, if the forces are so large as to extend the coil of the spring, a locking or restraining element comes into force which will be described with reference to FIG. 11.

The tension spring comprises a central coil 58 and two anchoring hooks 59, 60. The hook 59, on the left hand end of the spring 55, passes through the anchorage point 54 of the locking collar 51 and turns through to terminate in an end portion formed as a loop 61 of rectangular shape. The long sides 62 of the rectangular loop 61 are aligned with the longitudinal centre line of the spring 55. The other hook 60 at the opposite end of the spring 55 passes through the anchorage point 54 of the locking collar 52 and turns through 180° and extends back parallel to and external the coil 58 towards the loop 61 on the left hand end of the spring 55. The hook 60 has an end portion 63 which is turned through 90° so that it passes through the rectangular loop 61 at the end of the opposite hook 59. A speed washer or some other suitable fitting is then pushed onto the end portion 63 after it has passed through the loop 61. This forms a sliding anchor point for the right hand hook 60 to move within the rectangular loop 61 formed on the end of the left hand book 59.

It will now be seen that when tension is applied to each end of the spring the coil 58 will extend until the right hand hook 60 comes into contact with the inside of the rectangular loop 61 on the end of the left hand hook 59 thereby limiting the amount by which the spring 55 can extend. By this means, the locking collar 51, 52 on the wheel nuts 56, 57 respectively (shown shaded) is prevented from rotating or moving too far in an anticlockwise direction.

A fifth embodiment will now be described with reference to FIGS. 12A, 12B, 13 and 14, which show a locking device comprising a locking clip 64. The clip or element 64 is made from a good quality spring steel wire having a round or square section, though a square section is preferred for strength.

The locking clip or element 64 has a diagonal interconnecting part 64' (i.e. between X and Y in FIG. 12A) which extends tangentially between a pair of locking elements 65, one at each end of the part 64'. The locking elements 65 comprise two coils (shown in end view in FIG. 14) which are wrapped around or placed over a portion of a wheel nut 66 or 67 (shown in dotted/dashed lines in FIG. 12B). The interference/friction fit between the wheel nut 66 or 67 and the spring clip or element 64 prevents axial movement of the clip relative to the nut i.e. the clip is prevented from coming off the wheel nut. Furthermore, the part 64' serves as the actual restraining means positively linking tangentially adjacent wheel nuts 66 and 67 and prevents relative rotation thereof.

The locking elements 65 fit over the corners of the wheel nuts. Once in position, a hook 68 at one end of a locking limb 69 is pushed over and downwards into hooking engagement with a locking loop 70 disposed in the opposed locking limb 69.

In order to place the clip or element 64 over a pair of wheel nuts, the locking limbs 69 are moved away and apart from each other, which, because of the material's springiness/resilience, causes the locking elements/coils 65 to be opened up, thereby increasing the internal diameter of the elements/coils 65. The clip or element 64 can then be placed over and engage the corners of the wheel nuts 66 and 67.

Once in position, the limbs 69 are released and the hooks 68 are each fitted into their respective locking loops 70. This puts additional tension into the locking elements/coils 65, thus ensuring maximum interference/friction between the locking elements/coils 65 and the wheel nuts 66 and 67.

When locked in position, the device substantially prevents anticlockwise relative rotation of the wheel nuts, whilst allowing relative clockwise rotation of the wheel nuts using a suitable spanner. The clockwise rotation of the wheel nuts opens the locking element/coils 65, whilst the anti-clockwise rotation of the wheel nuts tightens the locking element/coils 65 onto the wheel nut, thereby increasing the locking effect.

The dimension across the "flats" of those locking devices referenced 20, 30 and 40 may be less than the external diameter of the nuts, in order to ensure a tighter interference/friction fit of the device on the nuts. Alternatively, the internal diameter of the circular locking element/coils 65 may be smaller than the diametrically opposed corner diameter of the wheel nuts, thereby making a tighter interference/friction fit of the device on the nuts.

In order to prevent corrosion or the like, the locking devices are preferably treated, for example phosphated or zinc-plated. Additional protective means may be provided for the locking devices, such as sockets or covers. The protective means may be formed from synthetic polymeric or elastomeric material or natural rubber.

The above-described locking devices rely on an interference/friction fit on the nuts to provide the mutual nut security. Extra location means may be additionally provided in each nut, such as grooving or channelling machined into corner/edge portions between adjacent flats on each nut. Such grooving or channelling will assist in the location of the locking device 30. Furthermore, the hexagonal head of each nut may be chamfered to provide shallow and wide grooving or channelling, in order to accommodate, and thereby assist in location of, the locking device 20.

All the previous descriptions have revolved around devices employing the use of some type of spring member/element. However, it is possible in some cases to use other mechanical means for providing for example by nut and bolt or a cam mechanism. It may also be possible to use some other means for providing a spring element for example a rubber or neoprene or any synthetic polymeric or elastomeric material which is resilient to provide a spring effect. It may also be possible to use some types of fibreglass or carbon fibre. However the spring steel generally speaking is the most economical and easily formed material.

I claim:

1. A locking device for securing at least two screwaction connectors, comprising means for anti-rotationally engaging both of said connectors, and means for interconnecting the engaging means to resist relative rotation of said connectors, wherein the engaging means comprises two resiliently flexible locking elements each having an expanded, relaxed position and a contracted, engaged position, each of which fits around a respective one of said connectors when in the relaxed position and which is embraceable therewith when in the contracted position, wherein the interconnecting means comprises an inextensible member that is tangentially connected to diametrically opposed portions of each of the locking elements, and wherein each of the locking elements additionally comprise a limb, each limb releasably engagable with the interconnecting means or the other limb so as to cause the locking element to move between its expanded, relaxed position and its contracted, engaged position, and further wherein the engaging means includes means for releasably engaging the limbs with respect to each other or the interconnecting means; whereby the locking elements are caused to grippingly engage said connectors when said limbs are so engaged and wherein the engaging means can fit over the screwaction connectors without the user overcoming the resilience of the device when the device is in its expanded, relaxed position.

2. A locking device as claimed in claim 1, wherein the two locking elements are a frictional fit with said connectors.

3. A locking device as claimed in claim 1, wherein the two locking elements are each configured for cooperation with a plurality of flat edges or the like of said connectors.

4. A locking device as claimed in claim 1, wherein the two locking elements are each configured for cooperation with a plurality of apexes or the like of said connectors.

5. A locking device as claimed in claim 1, wherein the interconnecting means is a substantially rectilinear member which is arranged to tighten one of said connectors in the event of the other of said connector rotating or attempting to rotate.

6. A locking device as claimed in claim 2, wherein the locking elements are each configured as one of a regular hexagon, a twenty-four sided regular polygon, and a circle, capable of gripping or engaging said connectors.

7. A locking device as claimed in claim 1, wherein each limb has a respective hooked end for engagement releasably with one of the interconnecting means and the other limb.

8. A locking device as claimed in claim 1, wherein additional locking means is provided to secure together each limb of the locking elements and the interconnecting means.

9. A locking device as claimed in claim 1, wherein the locking elements and interconnecting means comprise a resilient or tensile member formed from spring steel.

10. A locking device as claimed in claim 9, wherein the locking elements and the interconnecting means are treated to resist corrosion or the like.

11. A locking device as claimed in claim 10, wherein the locking elements and the interconnecting means are one of phosphated, zinc-coated, and coated with one of a synthetic polymetric, elastometric material and natural rubber.

12. A locking device as claimed in claim 1, being of clip form for interconnecting adjacent pairs of screw-action connectors.

13. A method for securing a wheel to a vehicle hub or axle comprising the step of using a locking device as defined by claim 12.

14. A method for securing a wheel locking system comprising the step of using a locking device as defined by claim 12.

15. A method of securing at least two screw-action connectors, comprising the steps of locating anti-rotational engaging means about both of said connectors, inextensibly linking said antirotational engaging means by interconnecting means dimensioned to resist relative rotation of said connectors, and bringing limbs of said engaging means into cooperating releaseable engagement with one of said interconnecting means or one another to cause said engaging means to grippingly embrace said connectors.

* * * * *